(12) United States Patent
Muruganantham (10) Patent No.: US 11,980,986 B1
(45) Date of Patent: May 14, 2024

(54) MATERIAL HARDNESS COMPENSATION IN AN AUTOMATED MILLING SYSTEM

(71) Applicant: Rathan P. Muruganantham, Watkinsville, GA (US)

(72) Inventor: Rathan P. Muruganantham, Watkinsville, GA (US)

(73) Assignee: Rathan P. Muruganantham, Watkinsville, GA (US)

( * ) Notice: Subject to any disclaimer, the term of this patent is extended or adjusted under 35 U.S.C. 154(b) by 0 days.

(21) Appl. No.: 18/491,775

(22) Filed: Oct. 22, 2023

(51) Int. Cl.
*B23Q 15/12* (2006.01)
*B23Q 15/013* (2006.01)
*B23Q 15/08* (2006.01)
*B23Q 17/20* (2006.01)

(52) U.S. Cl.
CPC ........... *B23Q 15/12* (2013.01); *B23Q 15/013* (2013.01); *B23Q 15/08* (2013.01); *B23Q 17/20* (2013.01); *B23Q 2717/006* (2013.01)

(58) Field of Classification Search
None
See application file for complete search history.

(56) References Cited

U.S. PATENT DOCUMENTS

| | | | |
|---|---|---|---|
| 3,720,120 A * | 3/1973 | Cutler | G05B 19/4163 82/118 |
| 4,558,977 A | 12/1985 | Inoue et al. | |
| 4,589,062 A | 5/1986 | Kishi et al. | |
| 4,789,931 A | 12/1988 | Kuragano et al. | |
| 4,986,664 A | 1/1991 | Lovoi | |
| 5,008,806 A | 4/1991 | Seki et al. | |
| 5,282,143 A | 1/1994 | Shirai et al. | |
| 6,587,747 B2 | 7/2003 | Hirai et al. | |
| 7,860,601 B2 | 12/2010 | Piggott et al. | |
| 9,785,137 B2 | 10/2017 | Chu et al. | |
| 11,644,811 B2 | 5/2023 | Tang et al. | |
| 2013/0189043 A1 * | 7/2013 | Uchiuzo | B23Q 15/12 408/1 R |
| 2021/0063995 A1 | 3/2021 | Tsuchiya | |

FOREIGN PATENT DOCUMENTS

| | | |
|---|---|---|
| CN | 203818253 U | 9/2014 |
| CN | 105855697 B | 1/2018 |
| CN | 108508845 B | 8/2019 |
| CN | 112666890 A | 9/2022 |
| EP | 3061563 A1 | 8/2016 |
| JP | 5845228 B2 | 1/2016 |

* cited by examiner

*Primary Examiner* — Ryan A Jarrett (57) ABSTRACT

A method and system for milling or engraving a workpiece provides improved throughput by varying one or both of a track speed or a rotational rate of a rotary cutting tool as the cutting tool cuts along a track. Multiple indications of material hardness are determined at a surface of the workpiece, movement of the cutting tool along a tool track is programmatically controlled to remove material from the workpiece, and one or both of a rotational rate of the tool or a track speed of the tool is adjusted along the tool track in conformity with the indications of material hardness, so that the rotational rate of the tool and/or the track speed is reduced at locations with harder material and increased at locations with softer material along the tool track.

17 Claims, 13 Drawing Sheets

MATERIAL HARDNESS COMPENSATION IN AN AUTOMATED MILLING SYSTEM

BACKGROUND OF THE INVENTION

1. Field of the Invention

The present invention relates generally to milling systems such as computer-numeric-controlled (CNC) machines, and in particular to an automated method and system for adjusting track speed and/or bit rotation rates based on determinations of hardness variation along a surface.

2. Description of the Related Art

CNC has become the de-facto standard for milling of materials and plastics, and extension to milling and engraving of harder and non-uniform materials such as stone has been introduced in the last several years. While plastic and metal raw stock are typically fairly uniform, stone, as a natural product, is not.

In order to successfully mill or engrave stone, or similarly hard materials, careful control of a relatively low track speed, i.e., the speed at which the cutting tool moves across the surface, is required, to avoid chipping the material and/or damaging the cutting tool. In order to increase production rates, on the other hand, it is desirable to maximize the track speed. Typically, once a material hardness is known, the track speed of a CNC machine is set, with variations controlled based on the pattern to be produced, including the track depth. The tool rotational rate is typically controlled by maintaining the rotational rate at the rotational rate dictated by the workpiece material. However, when a workpiece is non-uniform, the track speed must typically be set to the minimum value acceptable for milling the hardest material volume that may be encountered. Similarly, the tool rotation rate must be reduced to accommodate the hardest material volume that may be encountered.

Therefore, it would be desirable to increase tool track speed and rotational rate when milling/engraving non-uniform materials.

SUMMARY OF THE INVENTION

The above objectives of increasing tool track speed and rotational rate when milling/engraving non-uniform materials is accomplished in a method, system and computer program product that use and implement a CNC machine.

The method is a method of milling or engraving a workpiece that determines multiple indications of material hardness at a surface of the workpiece, programmatically controls movement of a cutting tool along a tool track described in a memory store to remove material from the workpiece, and adjusts one or both of a rotational rate of the tool or a speed of the tool along the tool track in conformity with the multiple indications of material hardness, so that one or both of the rotational rate of the tool or the speed of the tool along the track is reduced at first locations along the tool track in which the indications of material hardness indicate that the material is harder than a nominal hardness and increased at second locations along the tool track in which the indications of material hardness indicate that the material is softer than a nominal hardness.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure encompasses systems, methods and computer program products that mill or engrave a workpiece having a non-uniform surface hardness. The system and method programmatically control movement of a cutting tool along a tool track and adjust one or both of a rotational rate of the tool or a speed of the tool along the tool track according to the material hardness. The system and method determine multiple indications of material hardness at a surface of the workpiece, and perform the adjustment according to the material hardness, so that the rotational rate or the speed of the tool along the track is reduced where indications of material hardness indicate that the material is harder than a nominal hardness and is increased where the indications of material hardness indicate that the material is softer than a nominal hardness. While the following description is provided with reference to flowcharts describing a method, it is understood that the description and the calculations included therein are applicable to a process that may be implemented by an instruction processor, such as a general-purpose or dedicated computer system executing a computer program product according to an embodiment of the disclosure as described in further detail below.

Figure 1A:
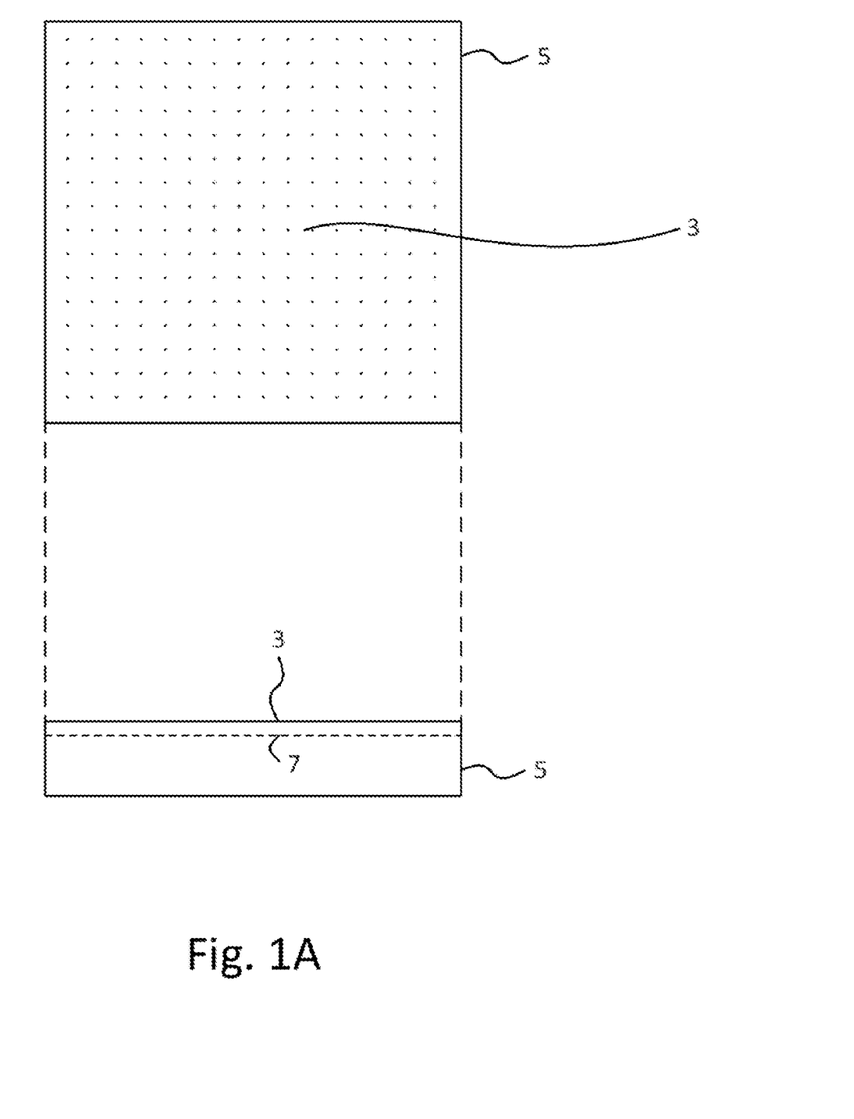
FIG. 1A is an orthographic view showing a top surface 3 of an example of an idealized workpiece 5, and a side view of example idealized workpiece 5, that may be milled or engraved by a system and method in accordance with an embodiment of the disclosure.

Referring now to FIG. 1A, an orthographic view shows a top surface 3 of an example of an idealized workpiece 5, and a side view of the example idealized workpiece 5, that may be milled or engraved by a system and method in accordance with an embodiment of the disclosure. A tool track depth 7, which is the depth of features to be formed, at and extending below top surface 3 to tool track depth 7, forms a plane beneath top surface 3. The features may be, for example, letters and numbers forming a written plaque, headstone, memorial monument plate, marker or other messaging to be formed on top surface 3 of idealized workpiece 5, which is generally a hard material such as stone, cast concrete, cast stone or other material of non-uniform hardness, which will be processed and engraved/milled as set forth in further detail below. Top surface 3 is perfectly planar in idealized workpiece 5, and engraving/milling of idealized workpiece 5 might proceed at a constant rotation rate and track speed, except for compensation needed to steer the tool to form corners and to end line and curve segments formed in idealized workpiece 5.

Figure 1B:
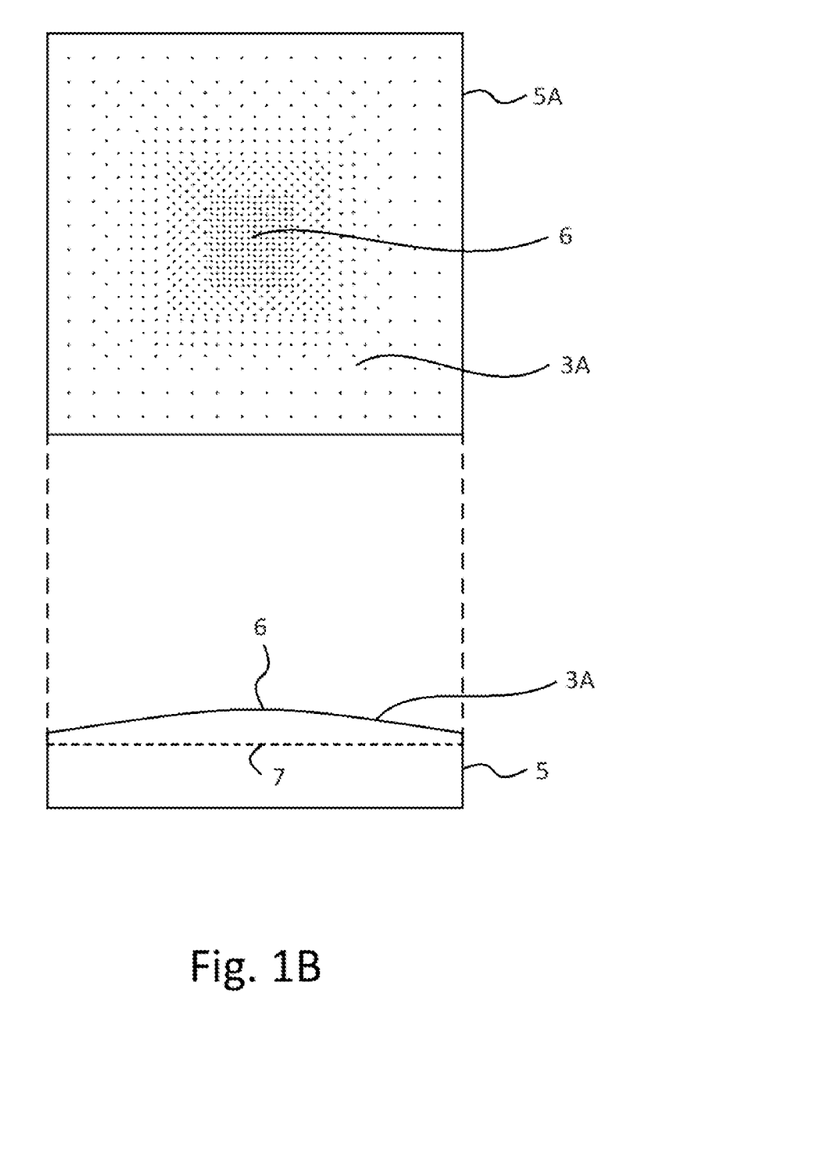
FIG. 1B is an orthographic view showing a top surface 3A of an example actual workpiece 5A, and a side view of example actual workpiece 5A, that may be milled or engraved by a system and method in accordance with an embodiment of the disclosure.

Referring now to FIG. 1B, an orthographic view shows a top surface 3A of an example actual workpiece 5A, and a side view of example actual workpiece 5A, that may be milled or engraved by a system and method in accordance with an embodiment of the disclosure. Actual workpiece 5A is only quasi-planarized, and includes surface height deviations 6, which are due to non-uniform material removal during a grinding process that prepares top surface 3A for engraving/milling. In the top portion of FIG. 1B illustrating the top view of top surface 3, the density of dots represents the surface height deviation magnitude, which correlates to the side view of surface height variation 6 illustrated in the bottom portion of FIG. 1B. Despite the surface height deviations 6 of example actual workpiece 5A, which are exaggerated in scale for the purposes of illustration, tool track depth 7 remains at the same plane as described above for idealized workpiece 5 of FIG. 1A. Rather than a conventional surface mapping and tool track alteration, which is performed to make the tool track conform to the variations of a typically non-planar surface, in the methods and systems described below with reference to various embodiments of the disclosure, surface height deviation information is only used to determine an indication of surface hardness, which is then applied to tool parameters, such as tool track velocity and/or tool rotational rate.

Figure 2:
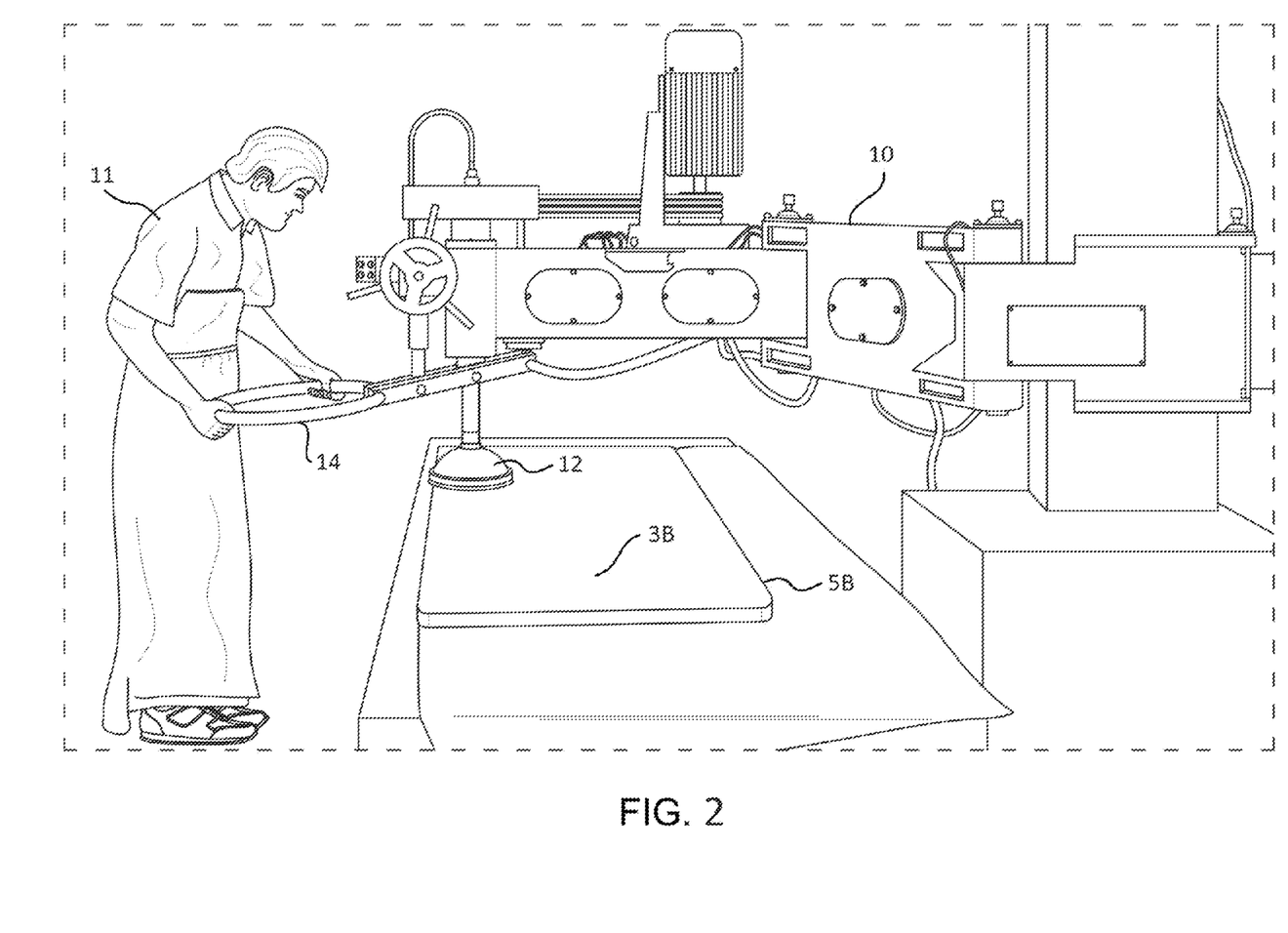
FIG. 2 is a pictorial view depicting an example grinding process that may be employed in a method according to an embodiment of the disclosure.

Referring now to FIG. 2, a pictorial view depicting an example grinding process that may be employed in a method according to an embodiment of the disclosure, is shown. An operator 11 moves a grinding tool 12 of a surface processing machine 10 by hand using a positioning handle 14, that moves grinding tool 12 along a surface 3B of a workpiece 5B. Workpiece 5B is of non-uniform hardness, which results in reduced removal of material from surface 3B in harder regions of workpiece 5B, and increased removal of material from surface 3B in softer regions of workpiece 5B, which results in deviations of surface height along surface 3B.

Figure 3A:
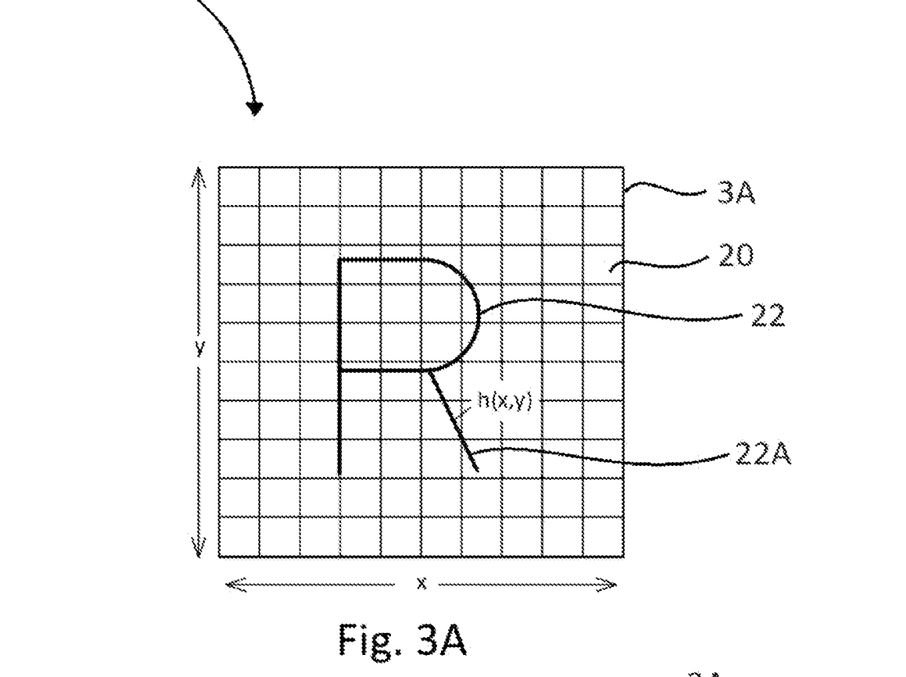
FIG. 3A and FIG. 3B are diagrams illustrating tool paths 22 on top surfaces 3A of example workpiece, illustrating example methods according to different embodiments of the disclosure.
Figure 3B:
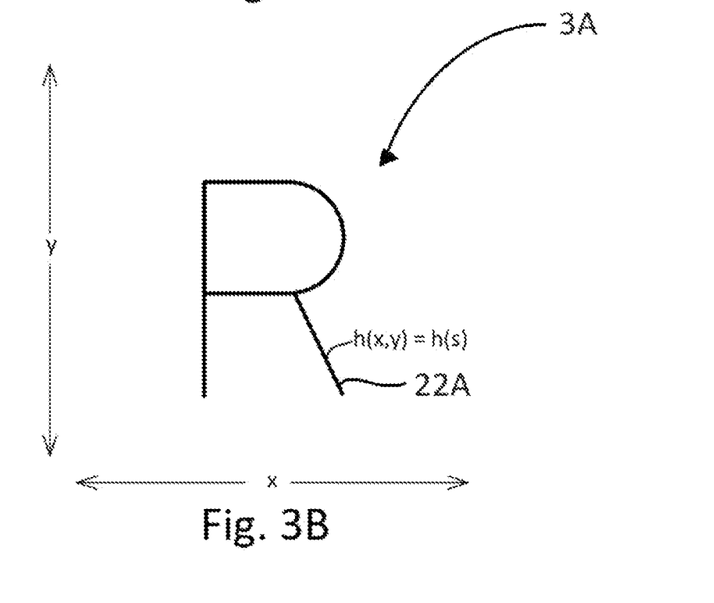

Referring now to FIG. 3A and FIG. 3B, diagrams illustrating a tool path 22A on top surfaces 3A of example workpiece are shown, illustrating example methods according to different embodiments of the disclosure. FIG. 3A illustrates a method in which a surface height map 20 is produced by inspection measurements as described below. Surface height map 20 is then used to produce values of height h, which is the local height above a plane of a workpiece to be engraved/milled, which may be a mean surface height plane, the tool track depth plane, etc. The values of height h are then used in calculations to determine tool track speed v and/or tool rotation rate R, either by calculating hardness values, in which case surface height map 20 may alternatively be a surface hardness map, and then using the hardness values to determine the tool parameters by interpolation between local hardness values, or directly, by using a known relationship between height/hardness and hardness/tool parameter values, to compute tool track speed v and/or tool rotation rate R directly from height h. The values of tool track speed v and/or tool rotation rate R may then used to operate an engraving/milling tool in track segments 22A making up tool track 22, which may be modified at ends of straight segments, for curves and for more abrupt changes in direction, according to the acceleration/deceleration characteristics of the positioner and tool combination. Such modifications are generally independent of local surface height and relate only to the X-Y positioning of the tool, and potentially rotation rate R, which may be scaled from whatever value the local height dictates for an unmodified section in the middle of a linear cut.

FIG. 3B illustrates an alternative method in which surface height h has been previously probed at points along tool track 22 produced by inspection measurements as described below. A surface height map is not required, and the values of height h may either be probed at a high enough resolution along tool track 22 that interpolation is not needed, or the values of height h used to determine the tool parameters may be interpolated between neighboring values along tool track 22. The values of height h are then used in calculations to determine tool track speed v and/or tool rotation rate R, as described above with reference to FIG. 3A.

Figure 4:
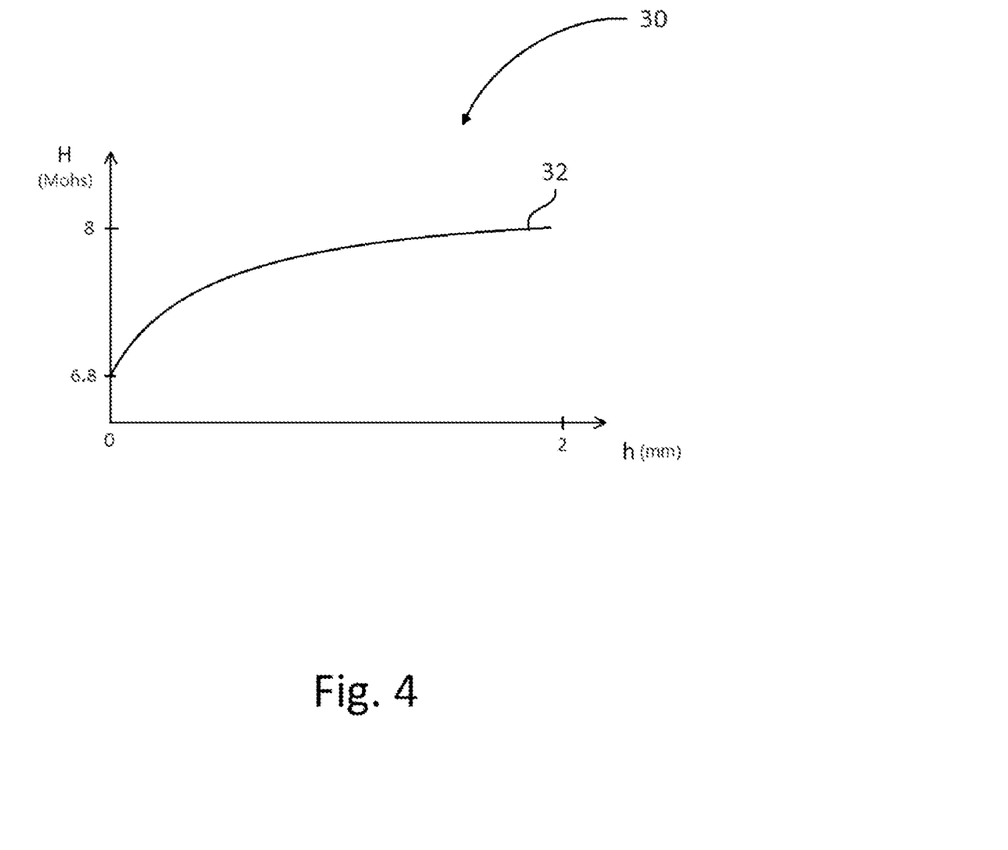
FIG. 4 is a graph 30 depicting an example relation between an example workpiece surface hardness H versus surface height deviation h, as may be used in calculations by an example system and method according to an embodiment of the disclosure.

Referring now to FIG. 4, a graph 30 is shown depicting an example relation between an example workpiece surface hardness H versus surface height deviation h, as may be used in calculations by an example system and method according to an embodiment of the disclosure. Surface hardness, illustrated in Mohs per millimeter increase in surface height deviation h, has a curve 32 that illustrates a hardness that increases as surface height deviation h increases.

Figure 5A:
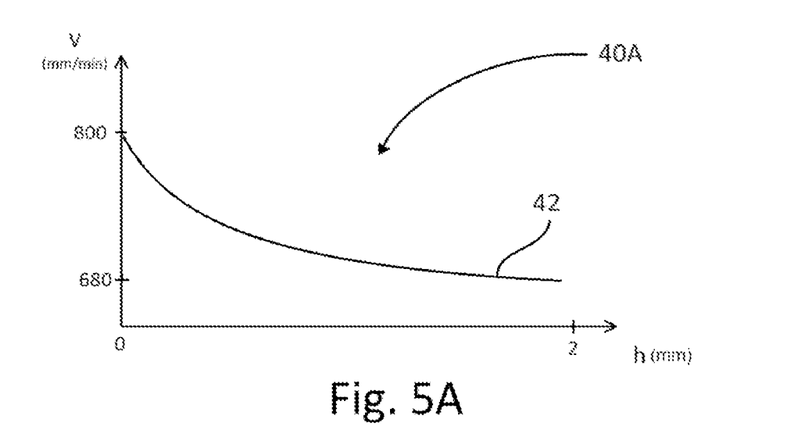
FIG. 5A is a graph 40A depicting an example relation between track speed v vs. workpiece surface height deviation h.

Referring now to FIG. 5A, a graph 40A is shown depicting an example relation between required track speed v vs. workpiece surface height deviation h, as may be used in calculations by an example system and method according to an embodiment of the disclosure. Track speed V may be a maximum track speed required to produce proper engraving/milling action without the tool bucking or causing chipping, or other visually unacceptable artifacts, cause by applying excessive force in the direction of the cutting track by the cutting bit of the tool. There may be a margin included to ensure that sudden changes in hardness or measurement error do not cause defects to occur. Curve 42 shows a relationship between track speed V and surface height deviation h, which already includes the relationship between hardness H and surface height deviation h illustrated in curve 32. Similarly, referring now to FIG. 5B, a graph 44 is shown depicting an example relationship between cutting bit rotational rate R vs. workpiece surface height deviation h, as may be used in calculations by an example system and method according to an embodiment of the disclosure. Table I, below, illustrates working values of track speed V and rotation rate R for specific values of hardness H.

TABLE I

Figure 5B:
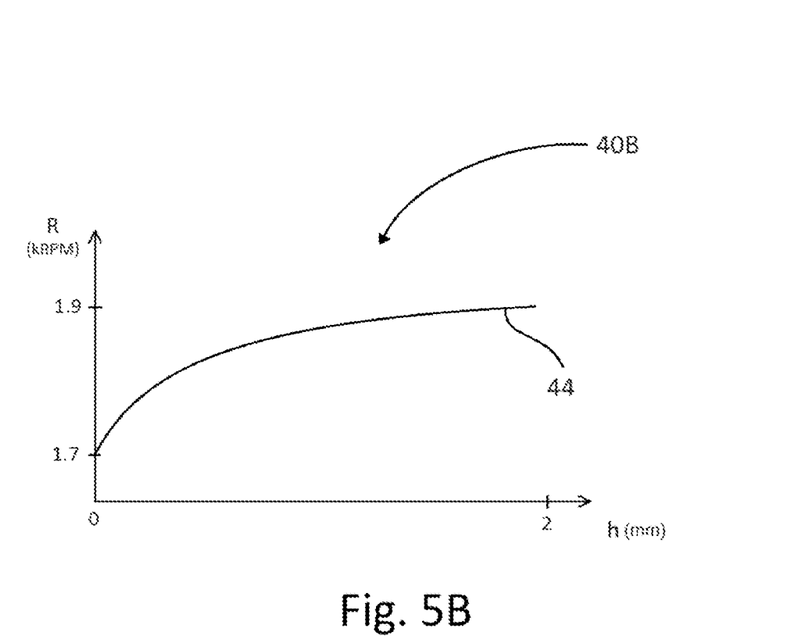
FIG. 5B is a graph 40B, depicting an example relation between cutting bit rotational rate R vs. workpiece surface height deviation h, as may be used in calculations by an example system and method according to an embodiment of the disclosure.

| Height deviation (mm) | Mohs pick value | Measured hardness | Approximate hardness | Track speed mm/min | Rotation Rate (rpm) |
|---|---|---|---|---|---|
| 0 | ~7 | ~6.8 | 6.8 | 800 | 17000 |
| 0.26 | 7+ | ~7.5 | 7.5 | 729 | 18160 |
| 0.69 | 7++ | ~7.7 | 7.7 | 709 | 18500 |
| 1.12 | 8− | ~7.9 | 7.83 | 697 | 18700 |
| 1.54 | 8− | ~7.9 | 7.92 | 688 | 18840 |
| 2.02 | ~8 | 8 | 8 | 680 | 19000 |

Figure 6A:
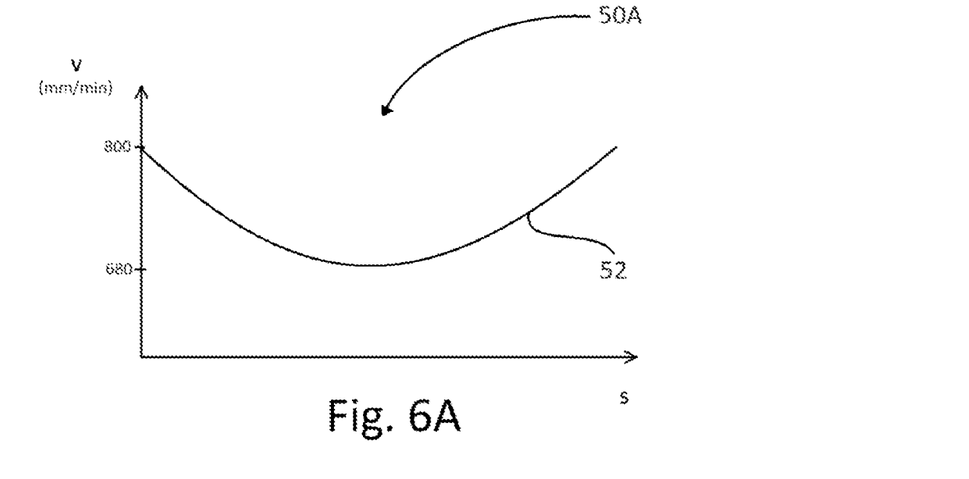
FIG. 6A is a graph 50A depicting an example profile of track speed v vs. distance s along an example tool track.
Figure 6B:
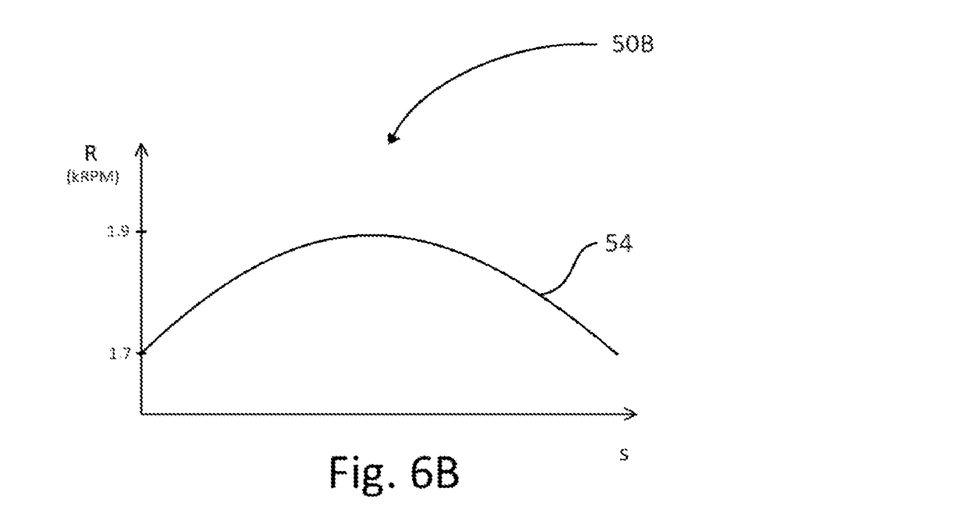
FIG. 6B is a graph 50B depicting an example profile of cutting bit rotational rate R vs. distance s along the example tool track, as may be implemented by an example system and method according to an embodiment of the disclosure.

Referring now to FIG. 6A, a graph 50A is shown, depicting an example profile of track speed V vs. distance s along an example tool track, and referring additionally to FIG. 6B, a graph 50B is shown depicting an example profile of cutting bit rotational rate R vs. distance s along the example tool track, as may be implemented by an example system and method according to an embodiment of the disclosure. In either of the schemes depicted above with reference to FIG. 3A or FIG. 3B, the ultimate computational product used to control the engraving/milling tool, is computed for a given track segment, either in advance of cutting, or on-the-fly while cutting, and the track speed V and cutting tool rotational rate R along the tool path is determined. As illustrated, curve 52 in graph 50A of FIG. 6A and curve 54 in graph 50A of FIG. 6A correspond to a lateral (one-dimensional) track across the surface height deviation profile 6 as illustrated in FIG. 1B, i.e., from the left side of top surface 3A to the right side of top surface 3A, so that the track speed V decreases toward the center of workpiece 5A and rotation rate R increases toward the center of workpiece 5A. An example of an empirical function relating track speed V and surface height deviation h has been determined as:

$$V = 1480 - 100h = 800 - 100h^{0.26},$$

where track speed V (in millimeters per minute) is determined from surface deviation h (in millimeters) yielding a minimum track speed of 700 mm/min. Typical values for surface height deviation are +/−3 mm, so that the range of h is typically from 0 mm to 6 mm, when normalized to shift the mean surface height to the center of the range. An example of an empirical function relating tool rotation rate R and surface height deviation h has been determined as:

$$R = 2500(h/5)^{0.26} + 6.8,$$

Where R in revolutions/minute (RPM).

Figure 7:
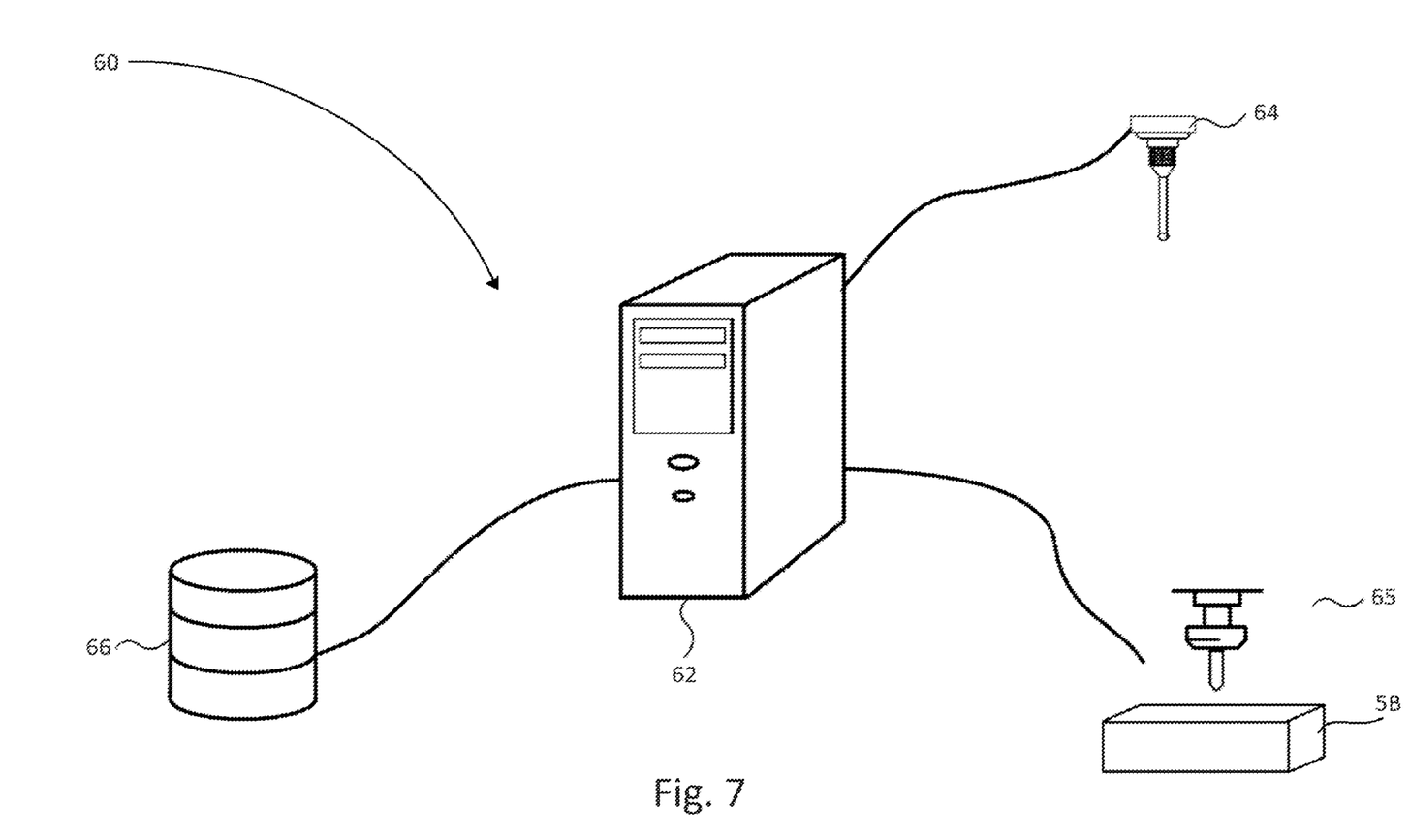
FIG. 7 is a pictorial diagram depicting a example system 60 in accordance with an embodiment of the disclosure.

Referring now to FIG. 7, a pictorial diagram depicting an example system 60 in accordance with an embodiment of the disclosure, is shown. System 60 includes at least one computer, controller, or server—represented by a computer 62. Computer 62 includes a processor and a memory 64, and is capable of receiving and storing data, performing calculations, and optionally controlling a machine tool. Memory 64 contains data about workpieces as described above, including the nominal parameter profile(s) and the set of nominal feature points shown in FIGS. 3 and 4. Workpiece data may be provided to memory 64 of computer 62 from a different computer, such as a separate machine that performs surface height measurements. Tool track data may also be loaded from another system, such as a CAD system or a 3-D modeling system and combined with the tool parameter control information computed for the surface height deviations determined for the individual tool track segments. System 60 may also include a mechanical, optical or acoustic probe 64 for measuring surface height values of a workpiece. Computer 62 determines the track speed V and/or tool rotation rate R values for the individual track segments based on the height measurement data as determined by probe 64. System 60 may also include a computer numeric control (CNC) machine 65, e.g., an engraver, which receives the toolpath control values (generally x, y, z coordinate values for the tool bit position) and tool parameter (track speed V, rotation rate R) control values from computer 502 and performs the CNC machining operation on the actual/new workpiece. CNC machine 65 is not a required part of some methods described herein with respect to some embodiments of the disclosure. Instead the control information determined by the methods described herein may be provided to a separate CNC machine. CNC machine 65 may be of any type suitable for engraving/milling workpieces as described herein, and which is controlled by a computer or processor to perform a machining function according to a model or data file defining a toolpath and tool parameters. In practice, probe 64 may be part of CNC machine 65 and computer 62 may be the controller of CNC machine 62. In some embodiments, operation of probe 64 and CNC machine 65 may be interleaved and/or overlapped, so that surface height measurements and consequent tool parameter adjustments are made on-the-fly. In some implementations, computer 62 may include multiple computers communicating on a wired or wireless network. It is understood that the computing function described above, including providing CAD data describing the nominal workpiece, the control of probe 640, the computational algorithms, and the control of CNC machine 65, may be performed by any combination of one or more computing devices without changing the scope or nature of the techniques disclosed herein. The computing devices may be general-purpose computers, customized controllers or processors, or any other computing device suitable for the purpose. As outlined herein, the processes, algorithms, methods and systems disclosed herein improve, in an unconventional manner, the performance of CNC machining operations for applications in which workpiece-to-workpiece and single workpiece material characteristic variations are significant, or in applications in which CNC machining operations are sensitive to minor material attribute variations, and in which the material attributes correlate with the variation of the surface height of the workpiece.

Figure 8:
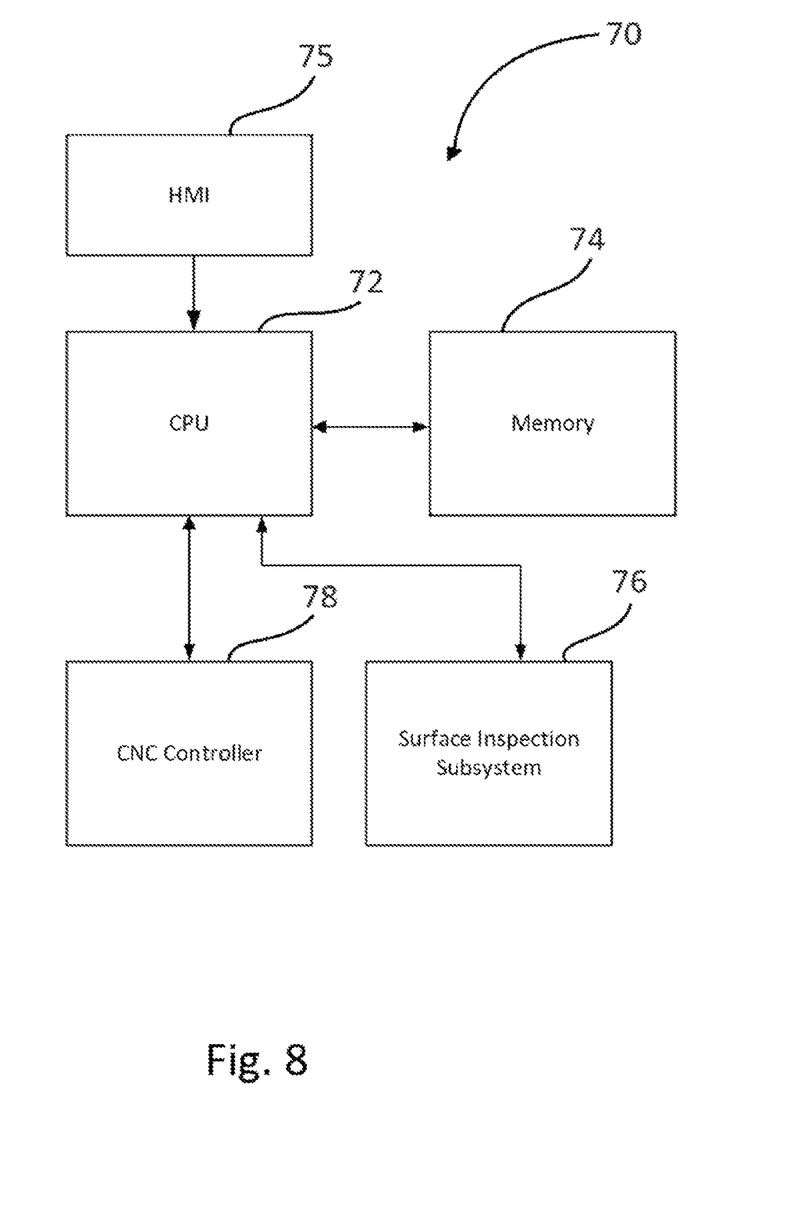
FIG. 8 is a block diagram depicting an example system 70 in accordance with an embodiment of the disclosure.

Referring now to FIG. 8, a block diagram depicting an example system 70 in accordance with an embodiment of the disclosure is shown, which may be used to implement example system 60 of FIG. 7. System 70 includes a central-processing unit (CPU) 72, such as a microcontroller or logic controller, coupled to memory 74 that stores data, such as track position parameters, surface height measurement data, computed tool parameter values, and program code constituting a computer-program product for controlling the operation of system 70. As used in this Application, computer-program product refers to a set of program instructions that is not a signal or wave, but is a stored representation of the program code on a media such as a flash drive, CD-ROM, DVD ROM, or in memory 74. Central-processing unit 72 is also coupled to input/output (I/O) circuits that generate control information provided to positioners and other components within a surface inspection subsystem 76 coupled to central-processing unit 72, and a CNC controller 78 also coupled to central-processing unit 72. Central-processing unit 72 is also coupled to a human-machine interface HMI, which may be a control pad, a tablet, a smart phone, a keyboard/mouse combination in a general purpose computer or another computer, and one or more displays, to provide for uploading program code, i.e., the computer-program product mentioned above, and to provide for control of the operation of system 70, e.g., commencing and shutting down operation, probing a workpiece surface and performing engraving/milling operations on workpieces.

Figure 9:
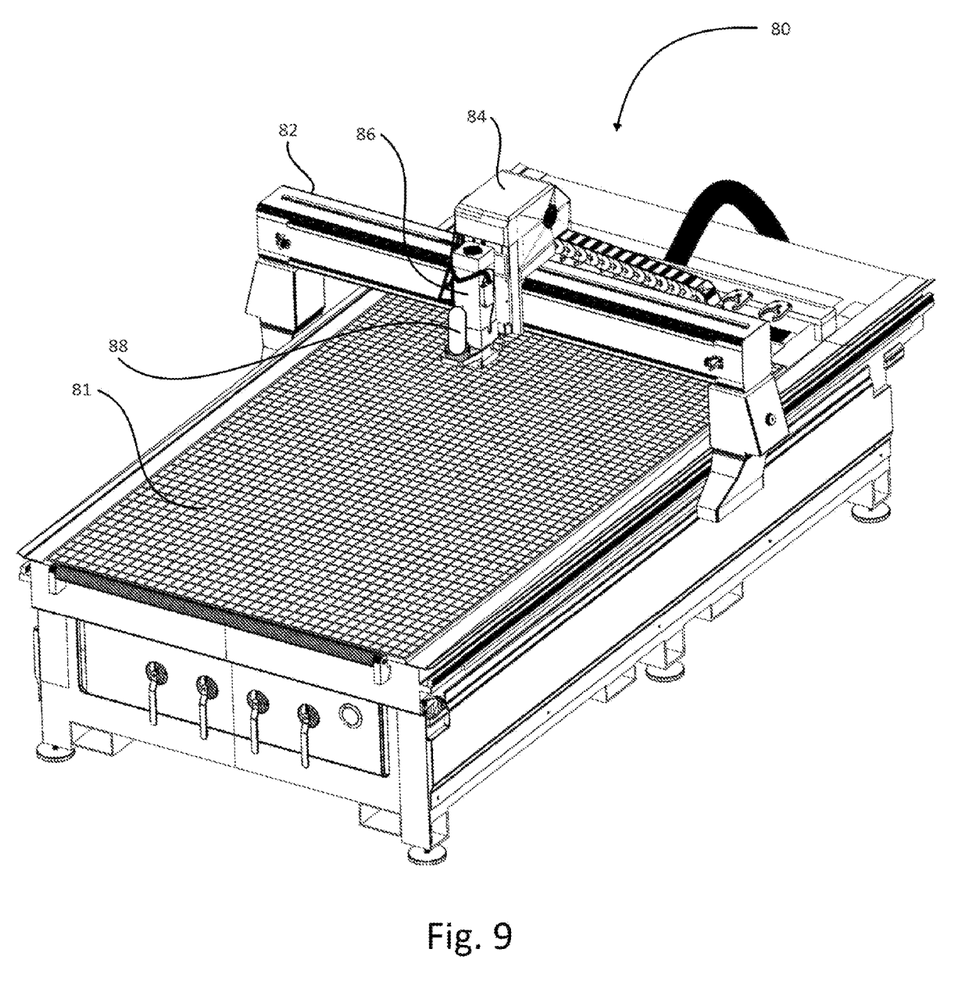
FIG. 9 is a pictorial diagram depicting an example engraving/milling subsystem 80 in accordance with an embodiment of the disclosure.

FIG. 9 is a pictorial diagram depicting an example engraving/milling subsystem 80 in accordance with an embodiment of the disclosure. Engraving/milling subsystem 80 is operated by program control as described below and provides surface height deviation measurements by deploying a retractable surface probe 88, which alternatively may be an optical, electromagnetic, or acoustic probe to obtain surface height data, which is averaged to find the mean surface level and in which individual measurements are compared to the mean surface height to determine the local height deviation. Probe 88 is then retracted, and milling/engraving operations are performed by a rotary cutting tool 86. Both probe 80 and cutting tool 86 are moved above a workpiece stabilized on a table 81 by movable gantry 82, which moves along the "X" coordinate axis and a carriage 84 that moves probe 80 and cutting tool 86 along the "Y" coordinate axis and which also includes a Z-axis retraction and extension mechanism that is used to move both probe 80 and cutting tool 86 above the workpiece to perform the probing and cutting operations. While a unified workstation approach is depicted, separate tables 81, gantries 82 and carriages 84 may be used for probe 80 and cutting tool 86, so that the probing process may be performed on a first workpiece, while the milling/engraving process is performed on another workpiece.

Figure 10:
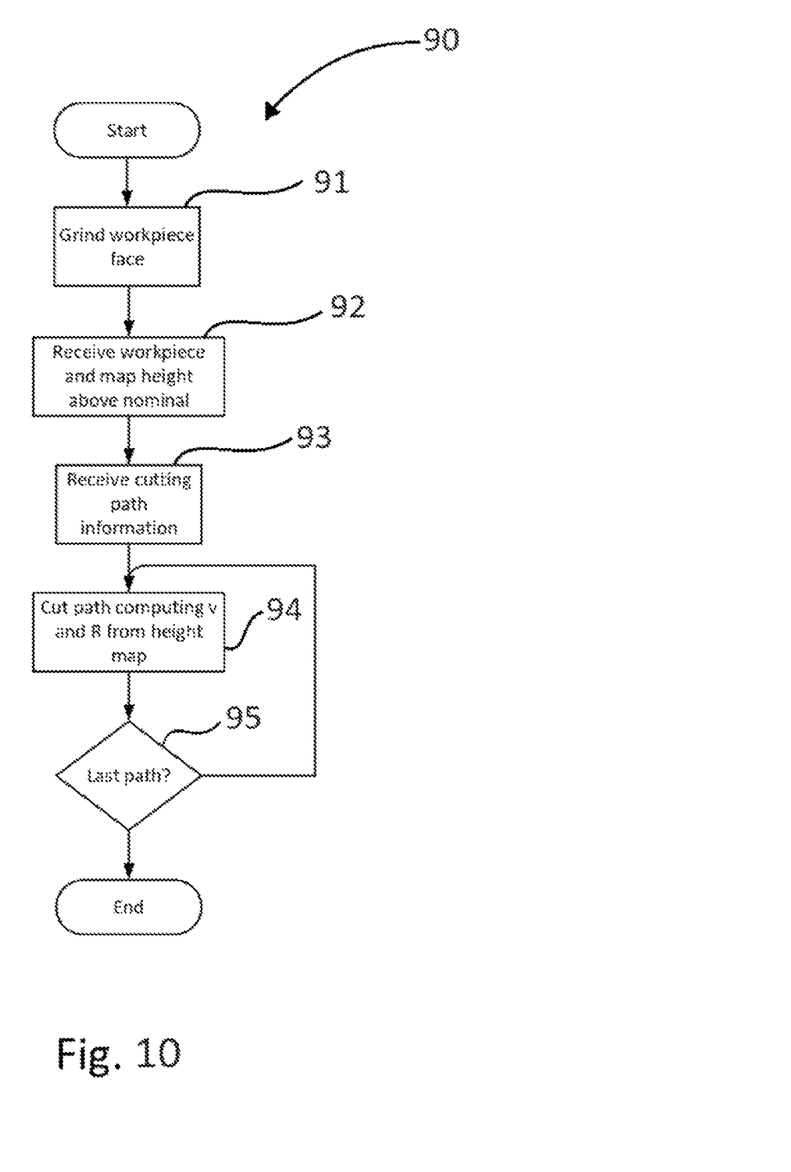
FIG. 10 is a flowchart 90 depicting an example method in accordance with an embodiment of the disclosure.

FIG. 10 is a flowchart 90 depicting an example method in accordance with an embodiment of the disclosure. First, a workpiece is ground (step 91), then the workpiece is received, probed and a height deviation map is generated for the surface of the workpiece with respect to a nominal height of the surface (step 92). Cutting path information is received (step 93) and the tool path is cut, computing track speed V and tool rotation rate R from the height map (step 94). Until the last path/segment is cut (decision 95) step 94 and decision 95 are repeated.

Figure 11:
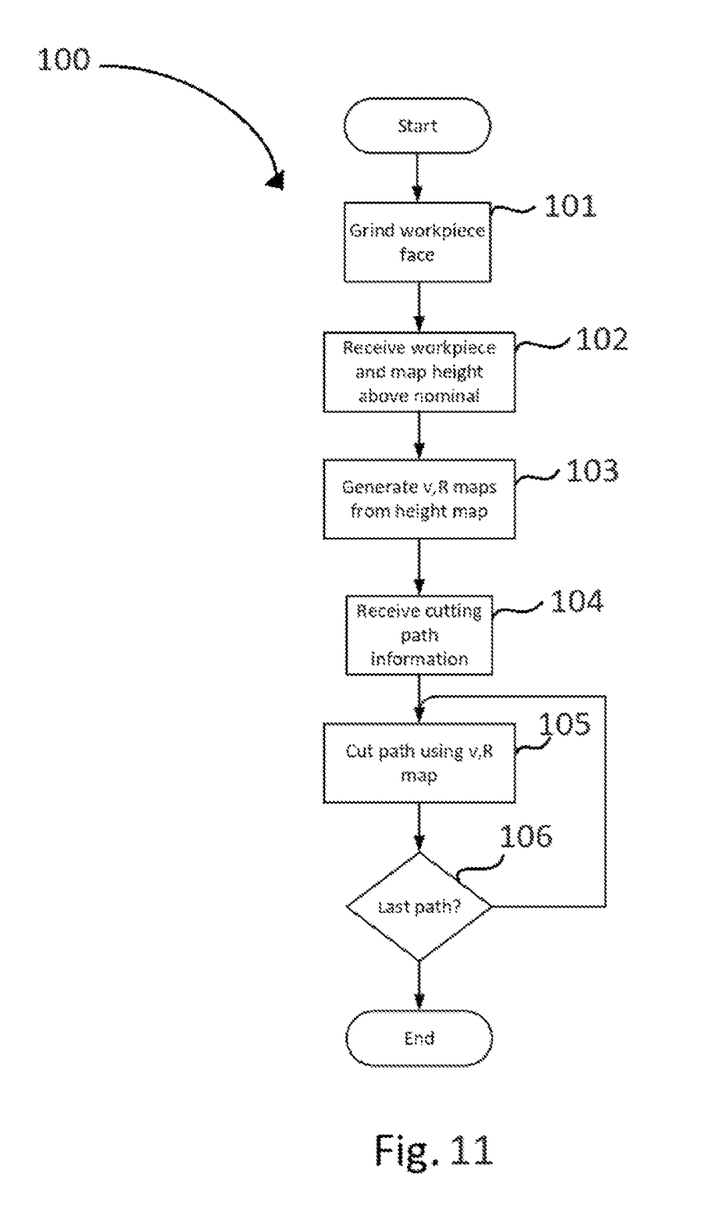
FIG. 11 is a flowchart 100 depicting an example method in accordance with another embodiment of the disclosure.

FIG. 11 is a flowchart 100 depicting an example method in accordance with another embodiment of the disclosure. First, a workpiece is ground (step 101), then the workpiece is received, probed and a height deviation map is generated for the surface of the workpiece with respect to a nominal height of the surface (step 102). A map of track speed V and tool rotation rate R is generated from the height measurements (step 103). Cutting path information is received (step 104) and the tool path is cut using track speed V and tool rotation rate R obtained from their respective maps (step 105). Until the last path/segment is cut (decision 106) step 105 and decision 106 are repeated.

Figure 12:
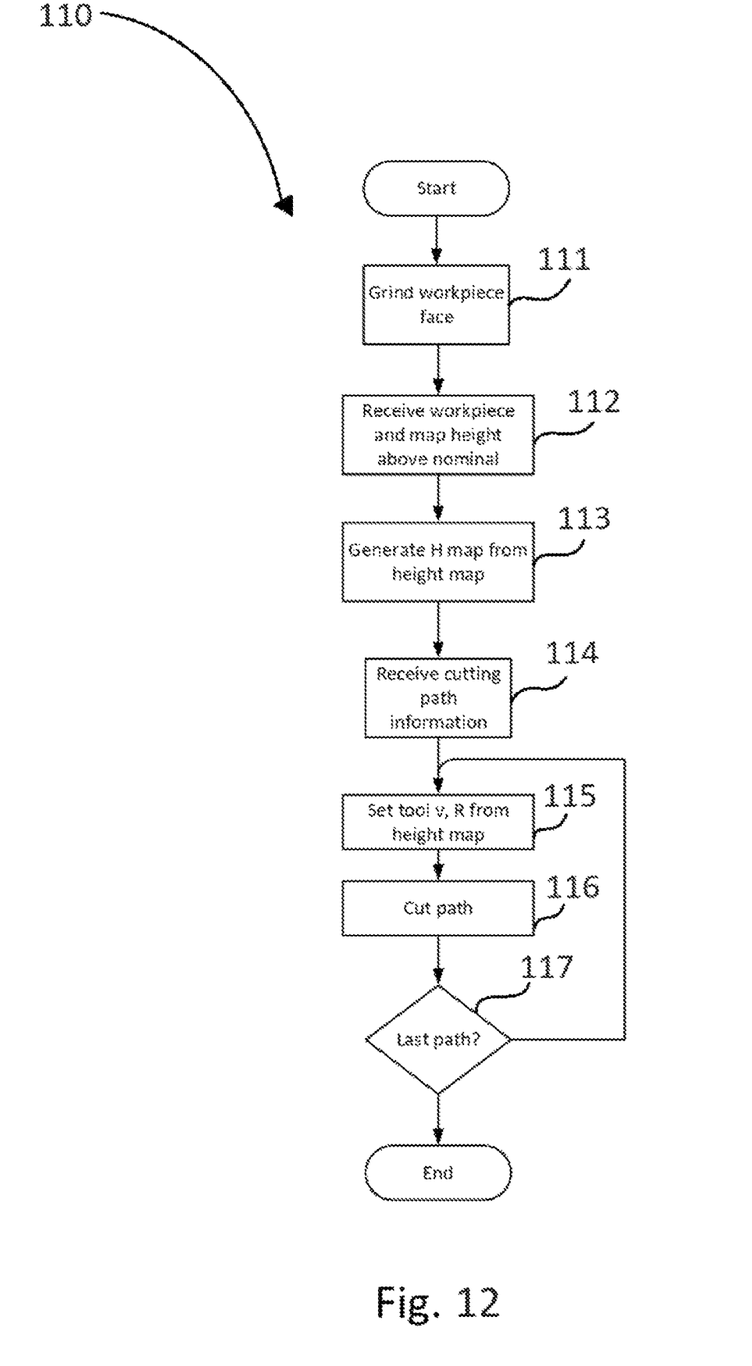
FIG. 12 is a flowchart 110 depicting an example method in accordance with another embodiment of the disclosure.

FIG. 12 is a flowchart 110 depicting an example method in accordance with another embodiment of the disclosure. First, a workpiece is ground (step 111), then the workpiece is received, probed and a height deviation map is generated for the surface of the workpiece with respect to a nominal height of the surface (step 112). Next, a map of hardness H is generated from the surface height deviation map (step 113). Cutting path information is received (step 114) and the tool path is cut using track speed V and tool rotation rate R set based upon the local hardness H obtained from the hardness map (step 115) and the path/segment is cut (step 116). Until the last path/segment is cut (decision 117) steps 115-117 are repeated. The flowcharts shown above are not an exhaustion of all possible ways in which surface height deviation may be used to control tool parameters across the cutting tracks of segments of patterns formed on a workpiece, but are provided to provide examples of control methodologies in which hardness is computed, and other methodologies in which the surface height deviation is used directly.

As mentioned above portions or all of the disclosed process may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium include the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions. These computer readable program instructions may also be stored in other storage forms as mentioned above and may be downloaded into a non-volatile memory for execution therefrom. However, the collection of instructions stored on media other than system non-volatile memory described above also form a computer program product that is an article of manufacture including instructions which implement aspects of the functions/actions specified in the flowcharts, block diagrams or individual blocks.

In summary, the instant disclosure discloses a method and system that mill or engrave a workpiece. The method is a method of operation of the system and may be embodied in a computer-program product that operates the system to carry out the method. The method may include determining multiple indications of material hardness at a surface of the workpiece, programmatically controlling movement of a cutting tool along a tool track described in a memory store to remove material from the workpiece, and adjusting one or both of a rotational rate of the tool or a speed of the tool along the tool track in conformity with the multiple indications of material hardness, so that one or both of the rotational rate of the tool or the speed of the tool along the track is reduced at first locations along the tool track in which the indications of material hardness indicate that the material is harder than a nominal hardness and increased at second locations along the tool track in which the indications of material hardness indicate that the material is softer than a nominal hardness.

The system may include a programmable controller operated by program code stored in a memory, a rotary tool including a cutting bit, and a positioner coupled to the programmable controller. The rotary tool may be guided programmatically by the programmable controller, and the program code may include program instructions for retrieving multiple indications of material hardness at a surface of the workpiece, controlling movement of the rotary tool with the positioner along a tool track described in a memory store to remove material from the workpiece, and program instructions for adjusting one or both of a rotational rate of the rotary tool or a speed of the tool along the tool track in conformity with the multiple indications of material hardness, so that one or both of the rotational rate of the tool or the speed of the tool along the track is reduced at first locations along the tool track in which the indications of material hardness indicate that the material is harder than a nominal hardness and increased at second locations along the tool track in which the indications of material hardness indicate that the material is softer than a nominal hardness. The abode described program instructions may be embodied in a computer program product comprising a signal-bearing media storing program instructions for operating the system to mill or engrave the workpiece as described above.

In some example embodiments, a depth of the tool track may be a cutting depth that does not vary with height variations of the surface of the workpiece. In some example embodiments, the method and system may measure variations of material height with respect to a nominal height of a surface of the workpiece, and may generate the multiple indications of hardness from the variations of material height. The method may further include grinding the surface of the workpiece with a grinder, so that less material may be removed from regions of harder material along the surface of the workpiece than is removed from regions of softer material along the surface of the workpiece. In some example embodiments, the method and system may further probe the surface of the workpiece to obtain the multiple indications of hardness. The probing may be performed with a mechanical probe at multiple locations on the surface of the workpiece.

In some example embodiments, the multiple indications of material hardness may be determined at a surface of the workpiece is performed only for locations along the tool track. In some example embodiments, the determining of the multiple indications of material hardness may be performed by generating and storing a height map extending in a plane parallel to a nominal surface of workpiece, and the adjustment of the rotational rate of the rotary tool or the speed of the tool along the tool track may include retrieving values from the height map corresponding to locations along the tool track, and updating one or both of the rotational rate of the tool or the speed of the tool according to the retrieved values. The updating may further include interpolating between the retrieved values to obtain estimates of surface height along the tool track. In some exampled embodiments, the system may further include a mechanical probe mechanically coupled to the positioner and electrically coupled to the programmable controller, and the program instructions may further include program instructions for probing the surface of the workpiece to obtain the multiple indications of hardness.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to milling of other materials having a non-uniform hardness or other material or structural characteristic that make adjusting track speed and/or bit rotational rate necessary or desirable for operation.

The invention claimed is:

1. A method of milling or engraving a workpiece, the method comprising:
    determining multiple indications of material hardness at a surface of the workpiece by measuring variations of material height with respect to a nominal height of a surface of the workpiece, and generating the multiple indications of hardness from the variations of material height;
    programmatically controlling movement of a cutting tool along a tool track described in a memory store to remove material from the workpiece; and
    adjusting one or both of a rotational rate of the tool or a speed of the tool along the tool track in conformity with the multiple indications of material hardness, so that one or both of the rotational rate of the tool or the speed of the tool along the track is reduced at first locations along the tool track in which the indications of material hardness indicate that the material is harder than a nominal hardness and increased at second locations along the tool track in which the indications of material hardness indicate that the material is softer than a nominal hardness.

2. The method of claim 1, wherein a depth of the tool track is a cutting depth that does not vary with height variations of the surface of the workpiece.

3. The method of claim 1, further comprising:
    grinding the surface of the workpiece with a grinder, wherein less material is removed from regions of harder material along the surface of the workpiece than is removed from regions of softer material along the surface of the workpiece; and
    probing the surface of the workpiece to obtain the multiple indications of hardness.

4. The method of claim 3, wherein the probing is performed with a mechanical probe at multiple locations on the surface of the workpiece.

5. The method of claim 1, wherein the determining multiple indications of material hardness at a surface of the workpiece is performed only for locations along the tool track.

6. The method of claim 1, wherein the determining multiple indications of material hardness at a surface of the workpiece comprises generating and storing a height map extending in a plane parallel to a nominal surface of workpiece, and wherein the adjusting further comprises:
    retrieving values from the height map corresponding to locations along the tool track; and
    updating one or both of the rotational rate of the tool or the speed of the tool according to the retrieved values.

7. The method of claim 6, wherein the updating further comprises interpolating between the retrieved values to obtain estimates of surface height along the tool track.

8. A system for milling or engraving a workpiece, comprising:
    a programmable controller operated by program code stored in a memory;
    a rotary tool including a cutting bit; and
    a positioner coupled to the programmable controller that is guided programmatically by the programmable controller to position the tool, and wherein the program code includes program instructions for retrieving multiple indications of material hardness at a surface of the workpiece by measuring variations of material height with respect to a nominal height of a surface of the workpiece and generating the multiple indications of hardness from the variations of material height, controlling movement of the rotary tool with the positioner along a tool track described in a memory store to remove material from the workpiece, and program instructions for adjusting one or both of a rotational rate of the rotary tool or a speed of the tool along the tool track in conformity with the multiple indications of material hardness, so that one or both of the rotational rate of the tool or the speed of the tool along the track is reduced at first locations along the tool track in which the indications of material hardness indicate that the material is harder than a nominal hardness and increased at second locations along the tool track in which the indications of material hardness indicate that the material is softer than a nominal hardness.

9. The system of claim 8, wherein a depth of the tool track is a cutting depth that does not vary with height variations of the surface of the workpiece.

10. The system of claim 9, further comprising a mechanical probe mechanically coupled to the positioner and electrically coupled to the programmable controller, and wherein the program instructions further comprise program instructions for probing the surface of the workpiece to obtain the multiple indications of hardness.

11. The method of claim 8, wherein the retrieving multiple indications of material hardness at a surface of the workpiece comprises generating and storing a height map extending in a plane parallel to a nominal surface of workpiece, and wherein the program instructions for adjusting further comprise program instructions for:

retrieving values from the height map corresponding to locations along the tool track; and updating one or both of the rotational rate of the tool or the speed of the tool according to the retrieved values.

12. The method of claim 11, wherein the program instructions for updating further comprise program instructions for interpolating between the retrieved values to obtain estimates of surface height along the tool track.

13. A computer program product comprising a non-transitory computer-readable storage medium storing program instructions for operating a system to mill or engrave a workpiece, the system including a programmable controller having a processor for executing the program instructions, a rotary tool including a cutting bit, and a positioner coupled to the programmable controller that is guided programmatically by the programmable controller to position the tool, and wherein the program instructions comprise program instructions for:

measuring variations of material height with respect to a nominal height of a surface of the workpiece;

generating multiple indications of hardness from the variations of material height programmatically controlling movement of a cutting tool along a tool track described in a memory store to remove material from the workpiece; and adjusting one or both of a rotational rate of the tool or a speed of the tool along the tool track in conformity with the multiple indications of material hardness, so that one or both of the rotational rate of the tool or the speed of the tool along the track is reduced at first locations along the tool track in which the indications of material hardness indicate that the material is harder than a nominal hardness and increased at second locations along the tool track in which the indications of material hardness indicate that the material is softer than a nominal hardness.

14. The computer program product of claim 13, wherein a depth of the tool track is a cutting depth that does not vary with height variations of the surface of the workpiece.

15. The computer program product of claim 13, and wherein the program instructions for measuring variations comprise program instructions for controlling positioning of a mechanical probe, and wherein the program instructions further comprise program instructions for probing the surface of the workpiece to obtain the multiple indications of hardness.

16. The computer program product of claim 13, wherein the retrieving multiple indications of material hardness at a surface of the workpiece comprises retrieving values of a height map extending in a plane parallel to a nominal surface of workpiece, and wherein the program instructions for adjusting further comprise program instructions for:

retrieving values from the height map corresponding to locations along the tool track; and updating one or both of the rotational rate of the tool or the speed of the tool according to the retrieved values.

17. The computer program product of claim 16, wherein the program instructions for updating further comprise program instructions for interpolating between the retrieved values to obtain estimates of surface height along the tool track.

\* \* \* \* \*